(12) United States Patent
Shuang et al.

(10) Patent No.: US 12,374,743 B2
(45) Date of Patent: *Jul. 29, 2025

(54) PACKAGING STRUCTURE AND BATTERY CORE USING THE SAME

(71) Applicants: Ningde Amperex Technology Limited, Fujian (CN); Dongguan NVT Technology Limited, Dongguan (CN)

(72) Inventors: Yajing Shuang, Ningde (CN); Xin Jin, Ningde (CN); Xiaozhao Huang, Ningde (CN); Zhi Chen, Ningde (CN)

(73) Assignees: NINGDE AMPEREX TECHNOLOGY LIMITED, Ningde (CN); DONGGUAN NVT TECHNOLOGY LIMITED, Dongguan (CN)

( * ) Notice: Subject to any disclaimer, the term of this patent is extended or adjusted under 35 U.S.C. 154(b) by 596 days.

This patent is subject to a terminal disclaimer.

(21) Appl. No.: 17/710,509

(22) Filed: Mar. 31, 2022

(65) Prior Publication Data

US 2022/0223952 A1 Jul. 14, 2022

Related U.S. Application Data

(63) Continuation of application No. PCT/CN2020/114843, filed on Sep. 11, 2020.

(30) Foreign Application Priority Data

Dec. 6, 2019 (CN) .......................... 201922176539.3
Mar. 18, 2020 (CN) .......................... 202020345930.1

(51) Int. Cl.
*H01M 50/184* (2021.01)
*H01M 10/0525* (2010.01)
(Continued)

(52) U.S. Cl.
CPC ..... *H01M 50/184* (2021.01); *H01M 10/0525* (2013.01); *H01M 50/105* (2021.01);
(Continued)

(58) Field of Classification Search
CPC ............. H01M 50/178; H01M 50/184; H01M 50/186; H01M 50/105; H01M 50/543;
(Continued)

(56) References Cited

U.S. PATENT DOCUMENTS 6,482,544 B1 * 11/2002 Shiota ................. H01M 50/133
429/185
7,875,383 B2   1/2011 Hwang et al.
(Continued)

FOREIGN PATENT DOCUMENTS

CN    2605667 Y    3/2004
CN    1610166 A    4/2005
(Continued)

OTHER PUBLICATIONS

Machine translation to English EP 3611775 A1, Wolter (Year: 2025).*

(Continued)

*Primary Examiner* — Barbara L Gilliam
*Assistant Examiner* — Lawrence La Raia, III
(74) *Attorney, Agent, or Firm* — XSENSUS LLP

(57) ABSTRACT

A packaging structure including an accommodating portion and a sealing portion is disclosed. The accommodating portion includes a first wall and a second wall facing each other, a first side wall connected to the first wall and the second wall, and, a second side wall connected to the first wall and the second wall. The second side wall intersects with the first side wall at a first side. The sealing portion includes a first sealing portion connected to the first side wall, a second sealing portion connected to the second side (Continued)

wall, and a third sealing portion connecting the first sealing portion and the second sealing portion. The first sealing portion is folded in a direction away from the second wall. The second sealing portion is folded toward the second wall.

20 Claims, 10 Drawing Sheets

(51) Int. Cl.
    *H01M 50/105*     (2021.01)
    *H01M 50/178*     (2021.01)
    *H01M 50/186*     (2021.01)
    *H01M 50/198*     (2021.01)
    *H01M 50/543*     (2021.01)
    *H01M 50/547*     (2021.01)
    *H01M 50/557*     (2021.01)

(52) U.S. Cl.
    CPC ....... *H01M 50/178* (2021.01); *H01M 50/186* (2021.01); *H01M 50/198* (2021.01); *H01M 50/543* (2021.01); *H01M 50/547* (2021.01); *H01M 50/557* (2021.01); *H01M 2220/30* (2013.01); *Y02E 60/10* (2013.01)

(58) Field of Classification Search
    CPC ............. H01M 50/198; H01M 50/547; H01M 50/557; H01M 10/0525; H01M 2220/30; Y02E 60/10
    See application file for complete search history.

(56) References Cited

U.S. PATENT DOCUMENTS

| | | | |
|---|---|---|---|
| 8,822,068 B2 | 9/2014 | Hwang et al. | |
| 11,362,363 B2 | 6/2022 | Qiu et al. | |
| 11,482,747 B2 * | 10/2022 | Kim | H01M 50/131 |
| 2003/0049527 A1 * | 3/2003 | Yageta | H01M 50/553 |
| | | | 429/129 |
| 2005/0084749 A1 | 4/2005 | Hwang et al. | |
| 2011/0117394 A1 * | 5/2011 | Hwang | H01M 50/186 |
| | | | 429/7 |
| 2014/0212701 A1 | 7/2014 | Hur | |
| 2019/0173134 A1 * | 6/2019 | Lee | H01M 50/178 |
| 2019/0198909 A1 | 6/2019 | Qiu et al. | |

FOREIGN PATENT DOCUMENTS

| | | |
|---|---|---|
| CN | 201069784 Y | 6/2008 |
| CN | 201146199 Y | 11/2008 |
| CN | 202134624 U | 2/2012 |
| CN | 203218388 U | 9/2013 |
| CN | 106356565 A | 1/2017 |
| CN | 206250224 U | 6/2017 |
| CN | 206422169 U | 8/2017 |
| CN | 108574058 A | 9/2018 |
| CN | 209357758 U | 9/2019 |
| CN | 211088352 U | 7/2020 |
| CN | 211404531 U | 9/2020 |
| EP | 3611775 A1 * | 2/2020 |
| JP | 2006156161 A | 6/2006 |
| KR | 20180119989 A | 11/2018 |

OTHER PUBLICATIONS

International Search Report and Written Opinion mailed on Dec. 14, 2020, received for PCT Application PCT/CN2020/114843, filed on Sep. 11, 2020, 20 pages including English Translation.
Supplementary European Search Report mailed Jul. 4, 2024, in European Application No. 20895087.3, 8 pages.

* cited by examiner

PACKAGING STRUCTURE AND BATTERY CORE USING THE SAME

CROSS-REFERENCE TO RELATED APPLICATIONS

This application is a continuation application of International Patent Application No. PCT/CN2020/114843, filed on Sep. 11, 2020, which claims priority from Chinese Patent Application No. 202020345930.1, filed on Mar. 18, 2020, and Chinese Patent Application No. 201922176539.3, filed on Dec. 6, 2019. The contents of the aforementioned patent applications are incorporated herein by reference in their entirety.

TECHNICAL FIELD

This application relates to the field of batteries, and in particular, to a packaging structure and a battery core using the packaging structure.

BACKGROUND

Currently, with advantages such as high energy density, long cycle life, and freedom from memory effect, lithium-ion batteries are widely used in portable electronic devices such as mobile phones, digital video cameras, and laptop computers.

In order to ensure good packaging for cores of the lithium-ion batteries, specific widths of the top seal and side seals are usually preset. With the miniaturization of electronic devices, batteries applied to electronic devices also need to be miniaturized. However, miniaturization of batteries is prone to lead to poor stability of the packaging structures of the battery cores.

SUMMARY

In view of the foregoing situation, it is necessary to provide a packaging structure that is conducive to structure stability.

It is also necessary to provide a battery core using the packaging structure.

In an embodiment of this application, a packaging structure includes an accommodating portion and a sealing portion. The accommodating portion includes a first wall, a second wall, a first side wall, and a second side wall. The first wall and the second wall are opposite to each other, and the first side wall is connected to the first wall and the second wall. The second side wall is connected to the first wall and the second wall, and the second side wall intersects with the first side wall at the first side. The sealing portion includes a first sealing portion disposed on the first side wall, a second sealing portion disposed on the second side wall, and a third sealing portion connecting the first sealing portion and the second sealing portion. The first sealing portion is folded in a direction away from the second wall. The third sealing portion extends from the first sealing portion and beyond the first side, and the third sealing portion is folded toward a plane at which the second side wall is located. The second sealing portion is folded toward the second wall. As the first sealing portion and the second sealing portion are folded in opposite directions, a folding thickness of the third sealing portion in the packaging structure is reduced, which is conducive to stability of the packaging structure and also reduces a breakage probability of a folded side of the third sealing portion and space occupied by the packaging structure.

In an embodiment of this application, a junction of the sealing portion and the accommodating portion is located between a first plane at which the first wall is located and a second plane at which the second wall is located, so that the packaging structure has a double-concave portion structure. As the third sealing portion is located between the first plane at which the first wall is located and the second plane at which the second wall is located, the third sealing portion does not extend beyond the accommodating portion in a thickness direction, further reducing the space occupied by the packaging structure.

In an embodiment of this application, a portion of the second sealing portion protruding from the second wall is folded toward the second wall, further reducing the space occupied by the packaging structure.

In an embodiment of this application, the sealing portion is connected to a junction of the second wall and the first side wall and a junction of the second wall and the second side wall, so that the packaging structure has a single-concave portion structure. Further, the second sealing portion is bent toward the second wall, further reducing the space occupied by the packaging structure.

In an embodiment of this application, the sealing portion is connected to a junction of the first wall and the first side wall and a junction of the first wall and the second side wall, so that the packaging structure has a single-concave portion structure.

In an embodiment of this application, the sealing portion and the accommodating portion are bonded by using an adhesive layer to increase stability of the packaging structure.

In an embodiment of this application, the second sealing portion includes a first portion and a second portion. The first portion intersects the second portion at a second side. The first portion is connected to the second side wall, the second portion is connected to the first portion and the third sealing portion, and the second portion is folded along the second side on a surface of the first portion that faces away from the accommodating portion. The second portion is not stacked with the third sealing portion, reducing a thickness of the packaging structure in the direction along the first wall.

In an embodiment of this application, a battery core includes an electrode assembly and the foregoing packaging structure. The electrode assembly includes a first electrode plate, a second electrode plate, and a separator disposed between the first electrode plate and the second electrode plate. The packaging structure packages the electrode assembly.

In an embodiment of this application, the battery core further includes a tab. The tab is connected to the first electrode plate, and is clipped to the first sealing portion or the second sealing portion. The tab protrudes from the packaging structure along the first sealing portion or the second sealing portion.

In an embodiment of this application, a packaging structure includes a first housing and a second housing. The first housing is provided with a first concave portion. The second housing is connected to the first housing to form a packaging body and a connecting portion, and the connecting portion is connected to the packaging body. The connecting portion is disposed at a junction of the first housing and the second housing. The connecting portion includes a first connecting portion and a second connecting portion. The first connecting portion is bent toward the first housing; and the second connecting portion is bent toward the second housing. The first sealing portion and the second sealing portion are bent in opposite directions, which is conducive to stability of the packaging structure.

In an embodiment of this application, the first housing includes a first wall and a first side wall extending from an edge of the first wall and the first wall surrounds the first wall, and an included angle between the first connecting portion and the first side wall is less than 90 degrees, reducing space occupied by the first connecting portion along a width direction of the packaging body and reducing a volume of the packaging structure. Preferably, the included angle between the first connecting portion and the first side wall is less than 10 degrees. Further, the first connecting portion and the first side wall are bonded by using a first adhesive layer, which is conducive to stability of the packaging structure.

In an embodiment of this application, the second housing is provided with a second concave portion, and the first concave portion and the second concave portion are disposed opposite to each other to form the packaging body. The second housing includes a second wall and a second side wall formed by extending from an edge of the second wall and the second side wall surrounds the second wall, and an included angle between the second connecting portion and the second side wall is less than 90 degrees, reducing space occupied by the second connecting portion along a length direction of the packaging body and reducing the volume of the packaging structure. Preferably, the included angle between the second connecting portion and the second side wall is less than 10 degrees. Further, the second connecting portion and the second side wall are bonded by using a second adhesive layer, which is conducive to stability of the packaging structure.

In an embodiment of this application, the second housing includes a flat second wall, and the connecting portion is disposed at a junction of the first housing and the second wall. The second connecting portion is bent toward the second wall, reducing space occupied by the second connecting portion along a length direction of the packaging body and reducing a volume of the packaging structure. The second connecting portion and the second wall are bonded by using a third adhesive layer, which is conducive to stability of the packaging structure.

In an embodiment of this application, the first housing includes a first flange connected to the packaging body, and the second housing includes a second flange connected to the packaging body. The first flange and the second flange are bonded to form the connecting portion. The connecting portion does not extend beyond the packaging body in a thickness direction of the packaging body, further reducing the volume of the packaging structure.

In an embodiment of this application, the connecting portion includes a third connecting portion that connects the first connecting portion and the second connecting portion. The third connecting portion partially overlaps the first connecting portion or the second connecting portion. Further, the third connecting portion is bonded to the first connecting portion or the second connecting portion at an overlapping portion by using a fourth adhesive layer, which is conducive to stability of the packaging structure.

In an embodiment of this application, a battery core includes an electrode assembly and the foregoing packaging structure that packages the electrode assembly. The electrode assembly includes a first electrode plate, a second electrode plate, and a separator disposed between the first electrode plate and the second electrode plate.

In an embodiment of this application, the battery core further includes a tab. The tab is connected to the first electrode plate, and is clipped to the first connecting portion or the second connecting portion. The tab protrudes from the packaging structure along the first connecting portion or the second connecting portion.

REFERENCE NUMERALS OF MAIN ELEMENTS

Figure 1A:
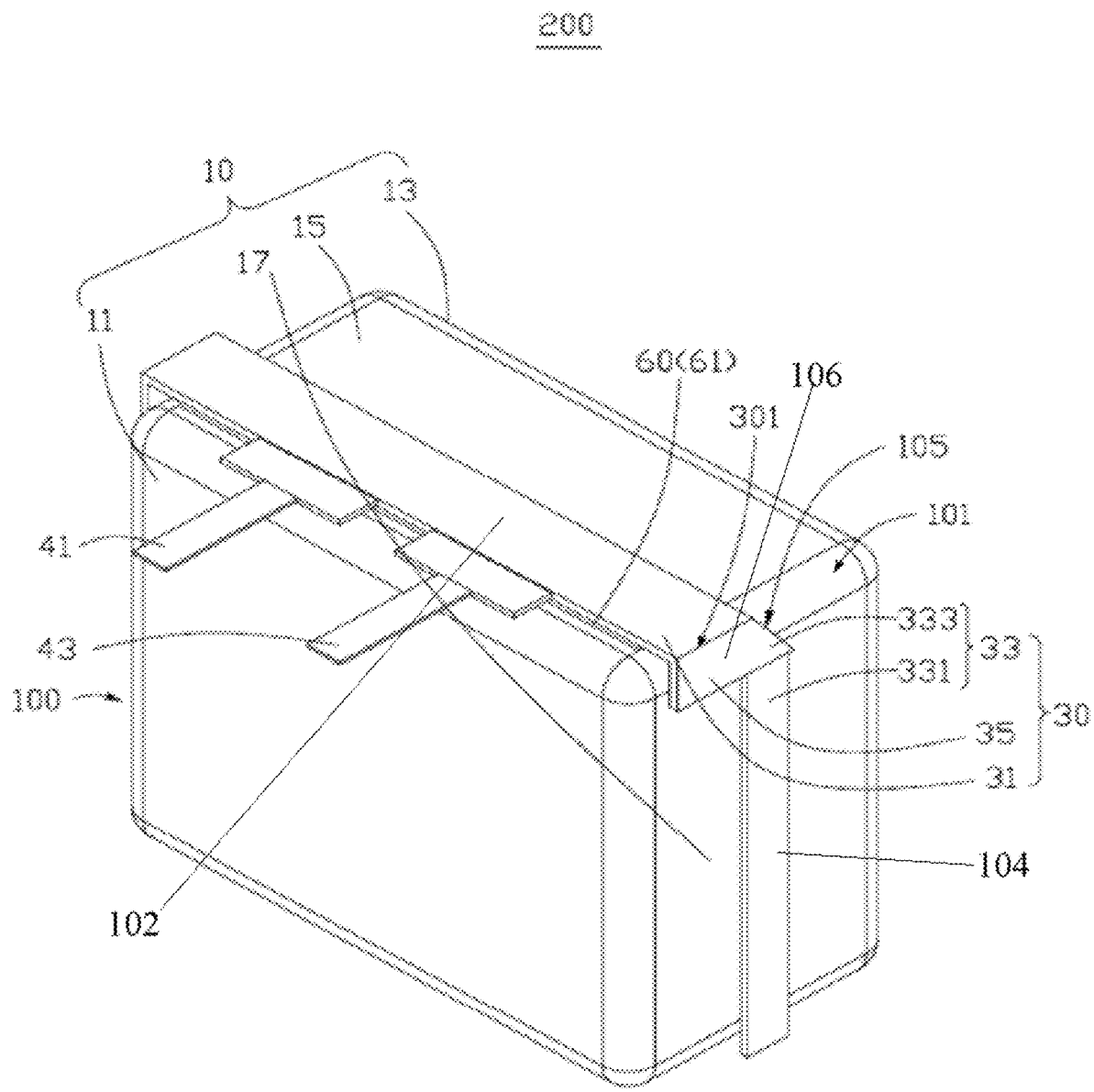
FIG. 1A is a stereoscopic schematic diagram of a battery core according to an embodiment of this application.

Packaging structure 100
First housing 100a
Second housing 100b
First concave portion 10a
First flange 30a
First region 10b
Second flange 30b
Accommodating portion 10
Sealing portion 30
Adhesive layer 60
First adhesive layer 61
Second adhesive layer 63
Third adhesive layer 65
Fourth adhesive layer 67
First wall 11
Second wall 13
First side wall 15
Second side wall 17
First side 101
First sealing portion 31
Second sealing portion 33
Third sealing portion 35
First intersecting side 301
First portion 331
Second portion 333
Second side 105
Battery core 200
First tab 41
Second tab 43
First connecting portion 102
Second connecting portion 104
Third connecting portion 106

This application will be further described in the following embodiments with reference to the foregoing accompanying drawings.

DETAILED DESCRIPTION

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts fall within the protection scope of this application.

Unless otherwise defined, all technical and scientific terms used herein shall have the same meanings as those commonly understood by a person skilled in the technical field of this application. The terms used herein in the specification of this application are only used to describe specific embodiments, and are not intended to limit this application.

The following describes in detail some embodiments of this application with reference to the accompanying drawings. Without conflicts, the following embodiments and features in the embodiments can be combined with each other.

Referring to FIG. 1A to FIG. 9, a packaging structure 100 includes a first housing 100a and a second housing 100b.

In some embodiments, the first housing 100a is provided with a first concave portion 10a and a first flange 30a connected to an opening of the first concave portion 10a. The second housing 100b includes a first region 10b and a second flange 30b connected to an edge of the first region 10b.

The first housing 100a and the second housing 100b are disposed opposite to each other and connected. The first concave portion 10a and the first region 10b are disposed opposite to each other, and the opening of the first concave portion 10a is connected to a peripheral edge of the first region 10b to form an accommodating portion 10, that is, a packaging body. The first flange 30a is corresponding to and combined with the second flange 30b to form a sealing portion 30 that extends beyond the accommodating portion 10, that is, a connecting portion. The sealing portion 30, that is, the connecting portion, is disposed at a junction of the first concave portion 10a and the first region 10b.

The sealing portion 30 is disposed on the surface of the accommodating portion 10 and is folded toward the accommodating portion 10. The packaging structure 100 may further include an adhesive layer 60. The adhesive layer 60 bonds the accommodating portion 10 and a surface of the sealing portion 30 that faces the accommodating portion 10.

The accommodating portion 10 includes a first wall 11, a second wall 13, a first side wall 15 and a second side wall 17. The first wall 11 and the second wall 13 are disposed oppose to each other, the first side wall 15 is connected to the first wall 11 and the second wall 13, and the second side wall 17 is connected to the first wall 11 and the second wall 13, and intersects with the first side wall 15 at a first side 101.

In some embodiments, a width of the sealing portion 30 extending out of the accommodating portion 10 may be, but is not limited to, 0.7 mm to 2.7 mm. Preferably, the width of the sealing portion 30 extending out of the accommodating portion 10 is 1.7 mm.

The sealing portion 30 includes a first sealing portion 31 connected to the first side wall 15, a second sealing portion 33 connected to the second side wall 17, and a third sealing portion 35 connected to the first sealing portion 31 and the second sealing portion 33.

The adhesive layer 60 may be bonded between at least one of these pairs: the first side wall 15 and a surface of the first sealing portion 31 that faces the first side wall 15, the accommodating portion 10 and a surface of the second sealing portion 33 that faces the accommodating portion 10, and the accommodating portion 10 and a surface of the third sealing portion 35 that faces the accommodating portion 10.

Figure 1B:
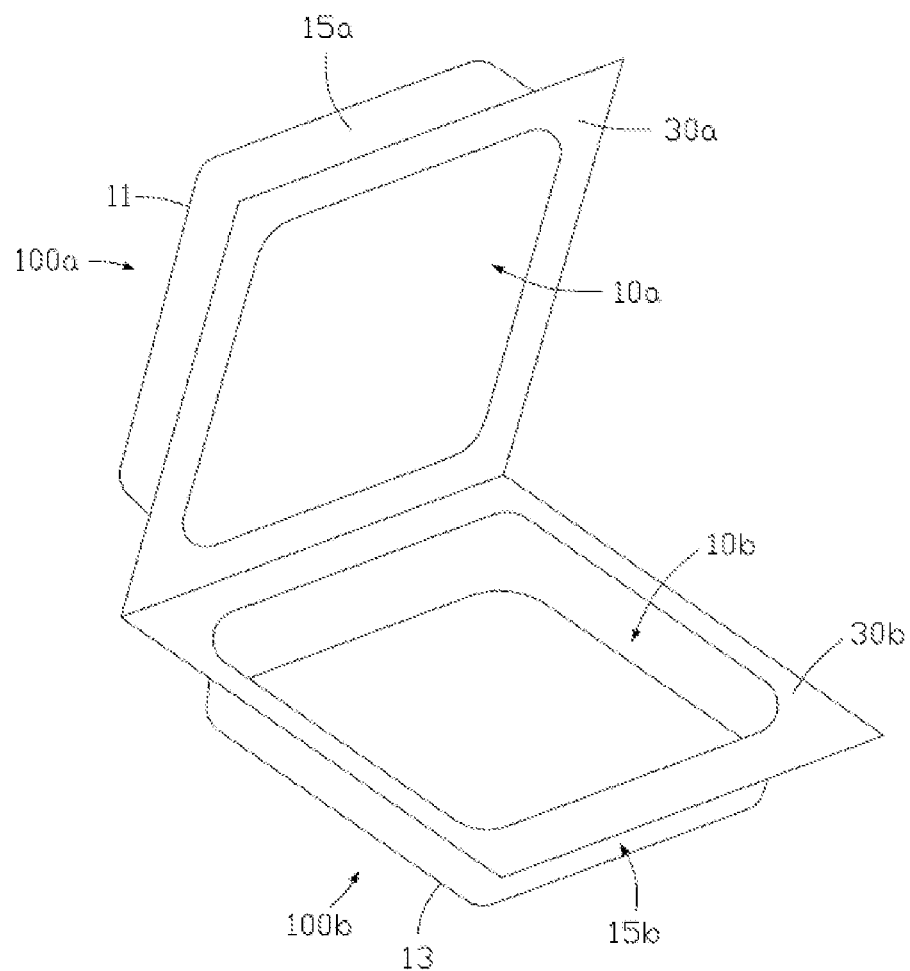
FIG. 1B is a disassembly schematic diagram of a packaging structure according to an embodiment of this application.

In some embodiments, referring to FIG. 1A and FIG. 1B, a junction of the sealing portion 30 and the accommodating portion 10 is located between a plane at which the first wall 11 is located and a plane at which the second wall 13 is located. In this case, the first region 10b is a concave portion, that is, a second concave portion. The first concave portion 10a and the second concave portion are disposed opposite to each other to form the accommodating portion 10. The opening of the first concave portion 10a is connected to an opening of the second concave portion, which means that the packaging body has a double-concave portion structure.

The first concave portion 10a includes the first wall 11 and a first side wall 15a formed by extending from an edge of the first wall and surrounding the first wall 11. The second concave portion includes the second wall 13 and a second side wall 15b formed by extending from an edge of the second wall 13 and surrounding the second wall 13.

The first sealing portion 31, that is, the first connecting portion 102, is bent toward a region of the accommodating portion 10 corresponding to the first housing 100a. Specifically, the first sealing portion 31 is folded in a direction extending away from the second wall 13. An included angle between the first sealing portion 31 and the first side wall 15a is less than 90 degrees. Preferably, the included angle between the first sealing portion 31 and the first side wall 15a is less than 10 degrees.

The third sealing portion 35 extends from the first sealing portion 31 and beyond the first side 101, and the third sealing portion 35 is folded toward a plane at which the second side wall 17 is located. The third sealing portion 35 includes a first intersecting side 301 connected to the first sealing portion 31. The second sealing portion 33 is folded toward the second wall 13.

Specifically, the adhesive layer 60 includes a first adhesive layer 61 bonded between the first side wall 15 and a surface of the first sealing portion 31 that faces the first side wall 15.

Figure 2:
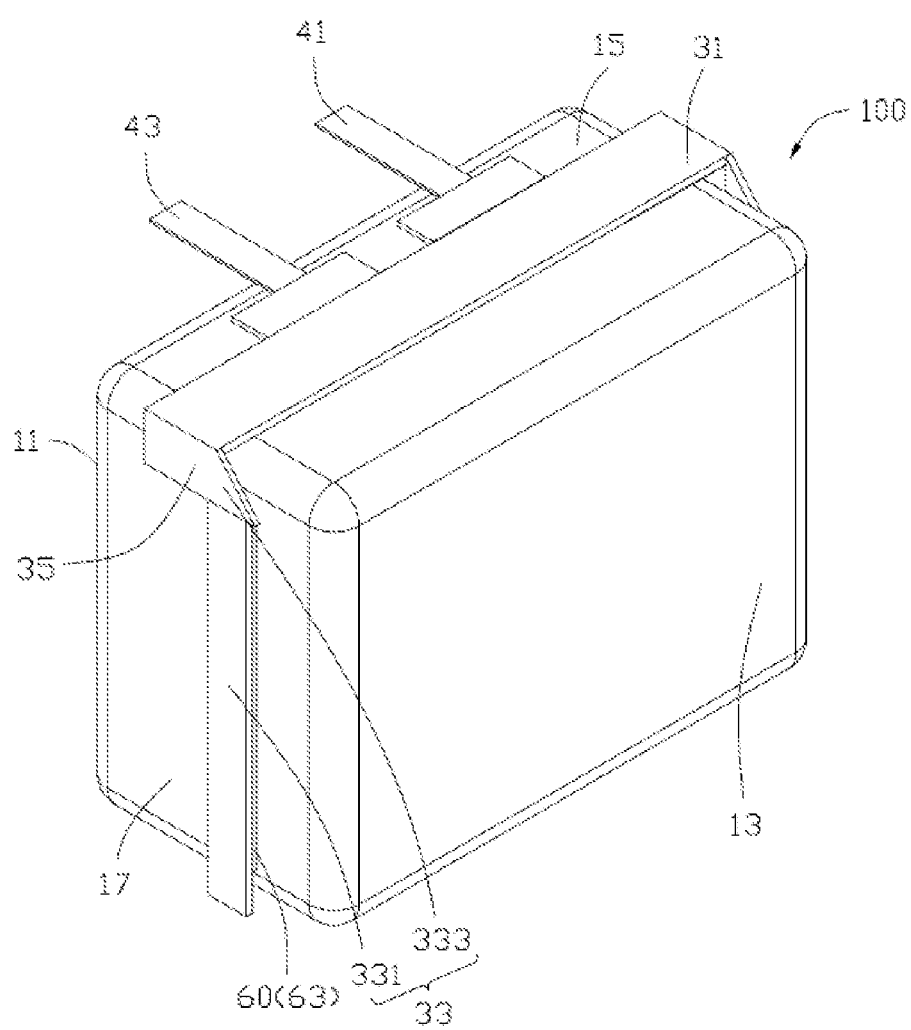
FIG. 2 is a stereoscopic schematic diagram of a battery core according to an embodiment of this application.
Figure 3:
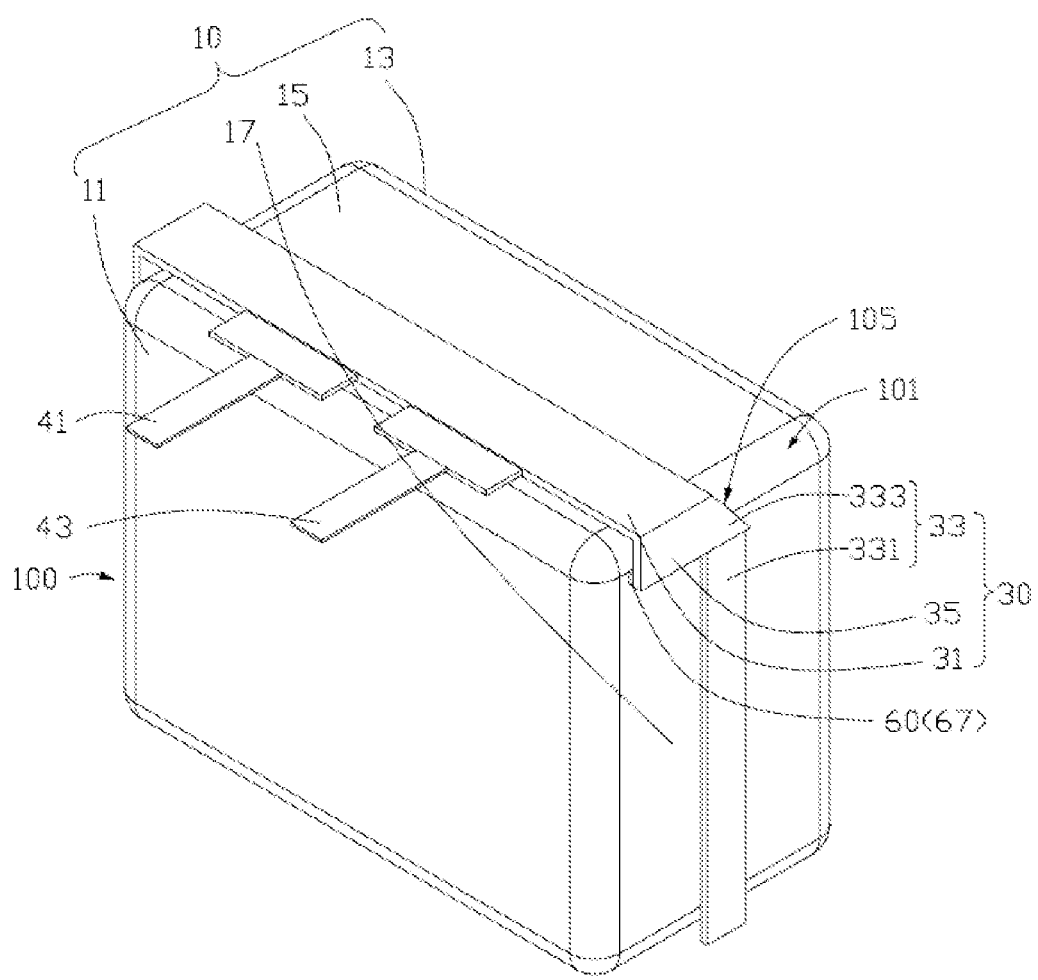
FIG. 3 is a stereoscopic schematic diagram of a battery core according to an embodiment of this application.

In some embodiments, referring to FIG. 2, the adhesive layer 60 may also be bonded between the second side wall 17 and a surface of the second sealing portion 33 that faces the second side wall 17, or referring to FIG. 3, the adhesive layer 60 may also include a fourth adhesive layer 67 bonded between the second side wall 17 and a surface of the third sealing portion 35 that faces the second side wall 17.

The second sealing portion 33 includes a first portion 331 (that is, a second connecting portion 104) and a second portion 333, and the first portion 331 and the second portion 333 intersect at a second side 105 (that is, a second intersecting side). The first portion 331 is connected to the second side wall 17, and the first portion 331, that is, the second connecting portion, is bent toward a region of the accommodating portion 10 corresponding to the second housing 100b. Specifically, an included angle between the first portion 331 and the second side wall 15b is less than 90 degrees. Preferably, the included angle between the first portion 331 and the second side wall 15b is less than 10 degrees. The second portion 333 is connected to the first portion 331 and the third sealing portion 35, and the second portion 333 is folded along the second side 105 on a surface of the first portion 331 facing away from the accommodating portion 10.

The third sealing portion 35 and the second portion 333 constitute a third connecting portion 106 to connect the first connecting portion (that is, the first sealing portion 31) and the second connecting portion (that is, the first portion 331). The second portion 333 overlaps the first portion 331.

An included angle between the first intersecting side 301 and the second side 105 is greater than or equal to 90 degrees.

In some embodiments, the third connecting portion may be in a shape of a right-angled trapezoid.

Specifically, the adhesive layer 60 may further include a second adhesive layer 63 disposed between the first portion 331 and the second side wall 17.

In some embodiments, referring to FIG. 3, the adhesive layer 60 may also be extended from between the second side wall 17 and a surface of the third sealing portion 35 that faces the second side wall 17 to a region of the second portion 333 that faces the first portion 331 and a region of the first portion 331 that faces the second portion 333.

Preferably, the first sealing portion 31 does not extend beyond the plane at which the first wall 11 is located, the second sealing portion 33 does not extend beyond the plane at which the second wall 13 is located, and the third sealing portion 35 does not extend beyond the plane at which the first wall 11 is located or the plane at which the second wall 13 is located. That is, the sealing portion 30 does not extend beyond the accommodating portion 10 in a thickness direction of the accommodating portion 10. More preferably, the sealing portion 30 is located between the plane at which the first wall 11 is located and the plane at which the second wall 13 is located.

More preferably, the first sealing portion 31 is stacked on the first side wall 15, the second sealing portion 33 is stacked on the second side wall 17, and the third sealing portion 35 is stacked on the second side wall 17.

In some embodiments, the first sealing portion 31 may protrude from the first wall 11, the second sealing portion 33 may protrude from the second wall 13, and the third sealing portion 35 may protrude from the first wall 11. When the second sealing portion 33 protrudes from the second wall 13, the portion of the second sealing portion 33 protruding from the second wall 13 is stacked on the second wall 13, and the adhesive layer 60 may also be disposed between the second wall 13 and the portion of the second sealing portion 33 protruding from the second wall 13 to bond the second sealing portion 33 and the second wall 13.

Figure 4:
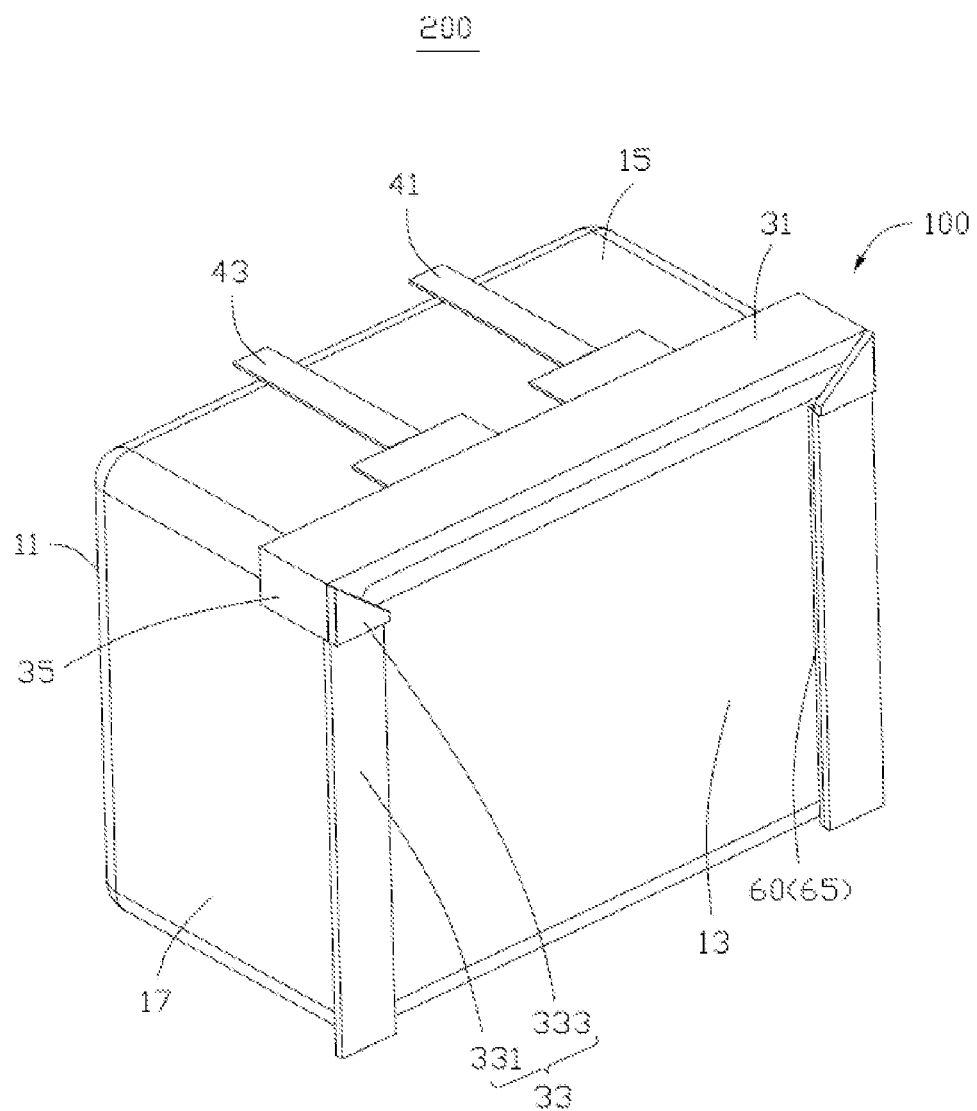
FIG. 4 is a stereoscopic schematic diagram of a battery core according to an embodiment of this application.
Figure 5:
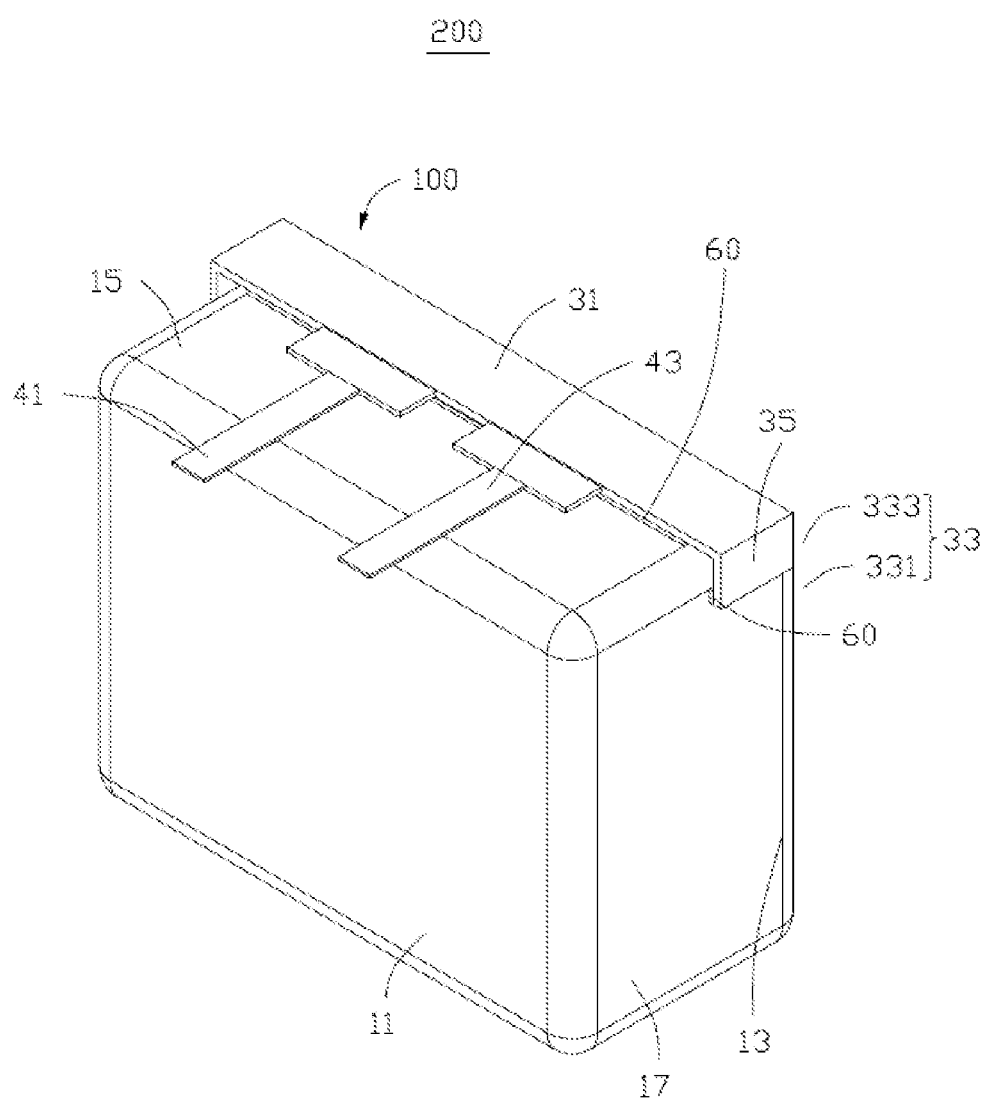
FIG. 5 is a stereoscopic schematic diagram of a battery core according to an embodiment of this application.
Figure 6:
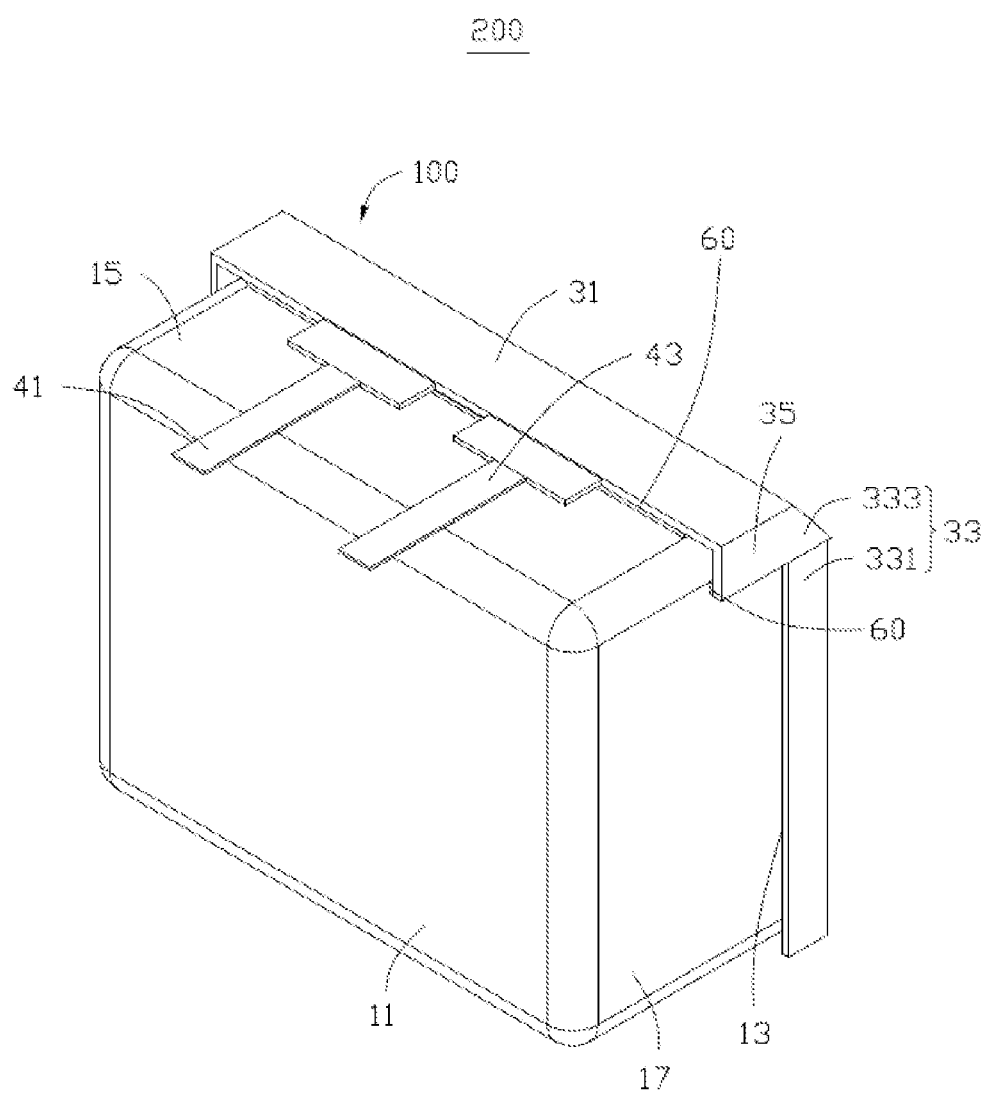
FIG. 6 is a stereoscopic schematic diagram of a battery core according to an embodiment of this application.

In some embodiments, referring to FIG. 4, FIG. 5 and FIG. 6, the sealing portion 30 is connected to a junction of the second wall 13 and the first side wall 15, and a junction of the second wall 13 and the second side wall 17. Specifically, the first sealing portion 31 is connected to the junction of the second wall 13 and the first side wall 15, and the second sealing portion 33 is connected to the junction of the second wall 13 and the second side wall 17. In this case, the first region 10b is flat, the first concave portion 10a and the first region 10b constitute the accommodating portion 10, and the opening of the first concave portion 10a is connected to a peripheral edge of the first region 10b. This means that the packaging body has a single-concave portion structure.

In some embodiments, referring to FIG. 4 and FIG. 5, the first sealing portion 31 is folded in a direction extending away from the second wall 13. The third sealing portion 35 extends from the first sealing portion 31 and beyond the first side 101, and the third sealing portion 35 is folded toward a plane at which the second side wall 17 is located. The second sealing portion 33 is stacked on the second wall 13.

In this embodiment, the first sealing portion 31 does not protrude from the first wall 11. Preferably, the first sealing portion 31 is stacked on the first side wall 15.

Referring to FIG. 5, the adhesive layer 60 is bonded between the first side wall 15 and a surface of the first sealing portion 31 that faces the first side wall 15.

In some embodiments, referring to FIG. 4, the adhesive layer 60 may include a third adhesive layer 65 bonded between the second wall 13 and a surface of the second sealing portion 33 that faces the second wall 13.

In some embodiments, referring to FIG. 5, the adhesive layer 60 may further be bonded between the second side wall 17 and a surface of the third sealing portion 35 that faces the second side wall 17.

In some other embodiments, the first sealing portion 31 may alternatively protrude from the first wall 11.

In some other embodiments, referring to FIG. 6, the first sealing portion 31 is connected to the junction of the second wall 13 and the first side wall 15, and the second sealing portion 33 is connected to the junction of the second wall 13 and the second side wall 17. The first sealing portion 31 is folded in a direction extending away from the second wall 13. The third sealing portion 35 is folded toward the second side wall 17. The second sealing portion 33 is folded in a direction extending away from the first wall 11. The adhesive layer 60 may be bonded between the first side wall 15 and a surface of the first sealing portion 31 that faces the first side wall 15, or may be bonded between the second side wall 17 and a surface of the third sealing portion 35 that faces the second side wall 17.

Figure 7:
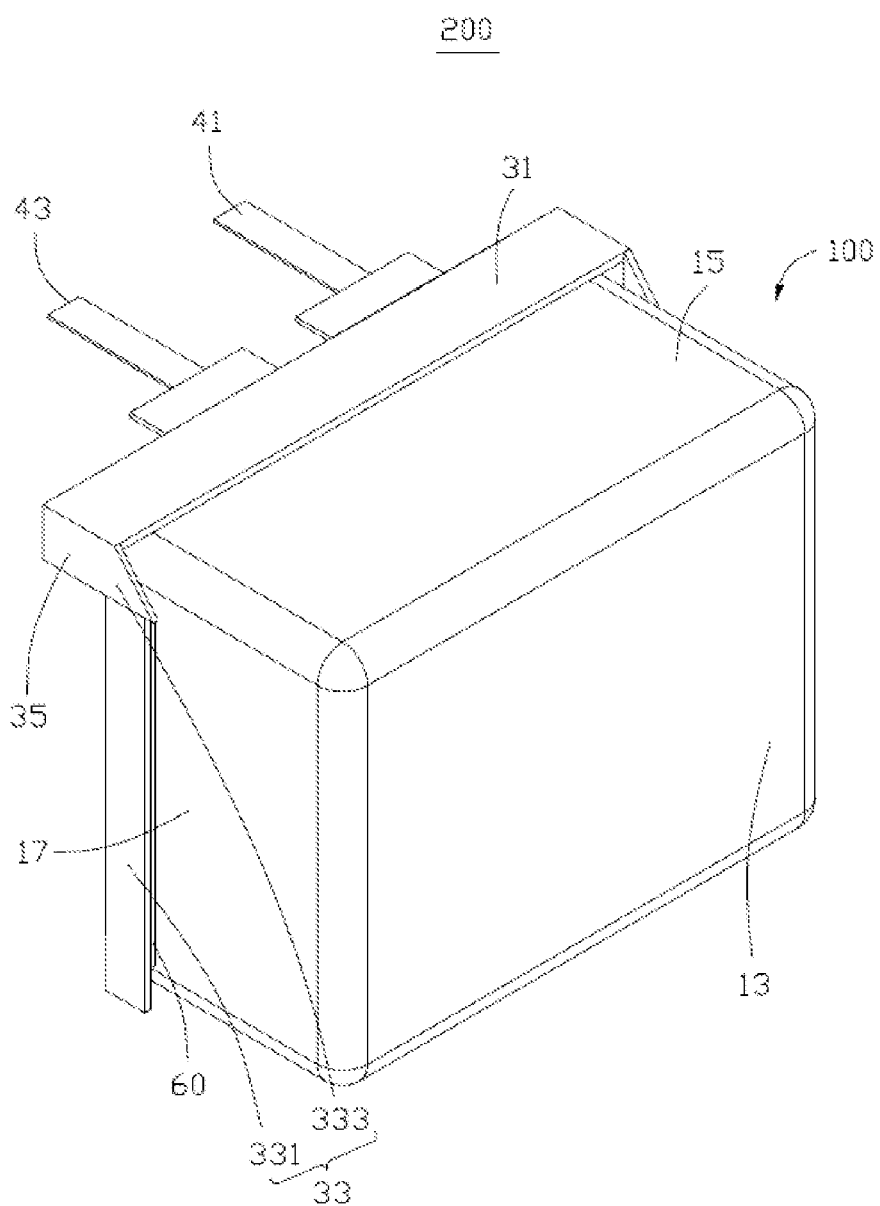
FIG. 7 is a stereoscopic schematic diagram of a battery core according to an embodiment of this application.

In some embodiments, referring to FIG. 7, the sealing portion 30 is connected to a junction of the first wall 11 and the first side wall 15, and a junction of the first wall 11 and the second side wall 17. Specifically, the first sealing portion 31 is connected to the junction of the first wall 11 and the first side wall 15, and the second sealing portion 33 is connected to the junction of the first wall 11 and the second side wall 17. In this case, a region of the first housing 100a at which the first concave portion 10a is originally disposed is flat and defined as a second region, and the first region 10b is a concave portion, namely, a second concave portion. The second concave portion and the second region constitute the accommodating portion 10, and an opening of the second concave portion is connected to a peripheral edge of the second region. This means that the packaging body has a single-concave portion structure.

The first sealing portion 31 is folded in a direction extending away from the second wall 13, and is on a side of the first wall 11 that faces away from the second wall 13. The third sealing portion 35 extends from the first sealing portion 31 and beyond the first side 101, and the third sealing portion 35 is folded toward the plane at which the second side wall 17 is located and is on the side of the first wall 11 that faces away from the second wall 13. The second sealing portion 33 is folded toward the second wall 13.

In this embodiment, the second sealing portion 33 does not protrude from the second wall 13. Preferably, the second sealing portion 33 is stacked on the second side wall 17.

The adhesive layer 60 is bonded between the second side wall 17 and a surface of the second sealing portion 33 that faces the second side wall 17.

In some other embodiments, the second sealing portion 33 may alternatively protrude from the second wall 13. Preferably, a portion of the second sealing portion 33 protruding from the second wall 13 may further be folded toward the second wall 13. Preferably, the portion of the second sealing portion 33 protruding from the second wall 13 is stacked on the second wall 13. In this case, the adhesive layer 60 may also be disposed between the second wall 13 and the portion of the second sealing portion 33 protruding from the second wall 13 to bond the second sealing portion 33 and the second wall 13. Referring to FIG. 1 to FIG. 9, the foregoing packaging structure 100 is applied to a battery core 200. The battery core 200 further includes an electrode assembly (not shown), and the electrode assembly includes a first electrode plate, a second electrode plate, and a separator disposed between the first electrode plate and the second electrode plate. The accommodating portion 10 accommodates the electrode assembly, and cooperates with the sealing portion 30 to package the electrode assembly. The accommodating portion 10 may further accommodate an electrolyte (not shown).

The battery core 200 further includes a first tab 41 and a second tab 43.

In some embodiments, referring to FIG. 1 to FIG. 7, the first tab 41 is clipped to the first sealing portion 31 and extends along the first sealing portion 31 so that one end of the first tab 41 protrudes from the packaging structure 100, and the other end of the first tab 41 is located in the accommodating portion 10 to connect the first electrode plate.

The second tab 43 is clipped to the first sealing portion 31 and extends along the first sealing portion 31 so that one end of the second tab 43 protrudes from the packaging structure 100, and the other end of the second tab 43 is located in the accommodating portion 10 to connect the second electrode plate.

A portion of the first tab 41 protruding from the first sealing portion 31 and a portion of the second tab 43 protruding from the first sealing portion 31 may be arranged along the direction of the first side wall 15, and extend beyond the first wall 11 to facilitate connection with other electronic elements.

Figure 8:
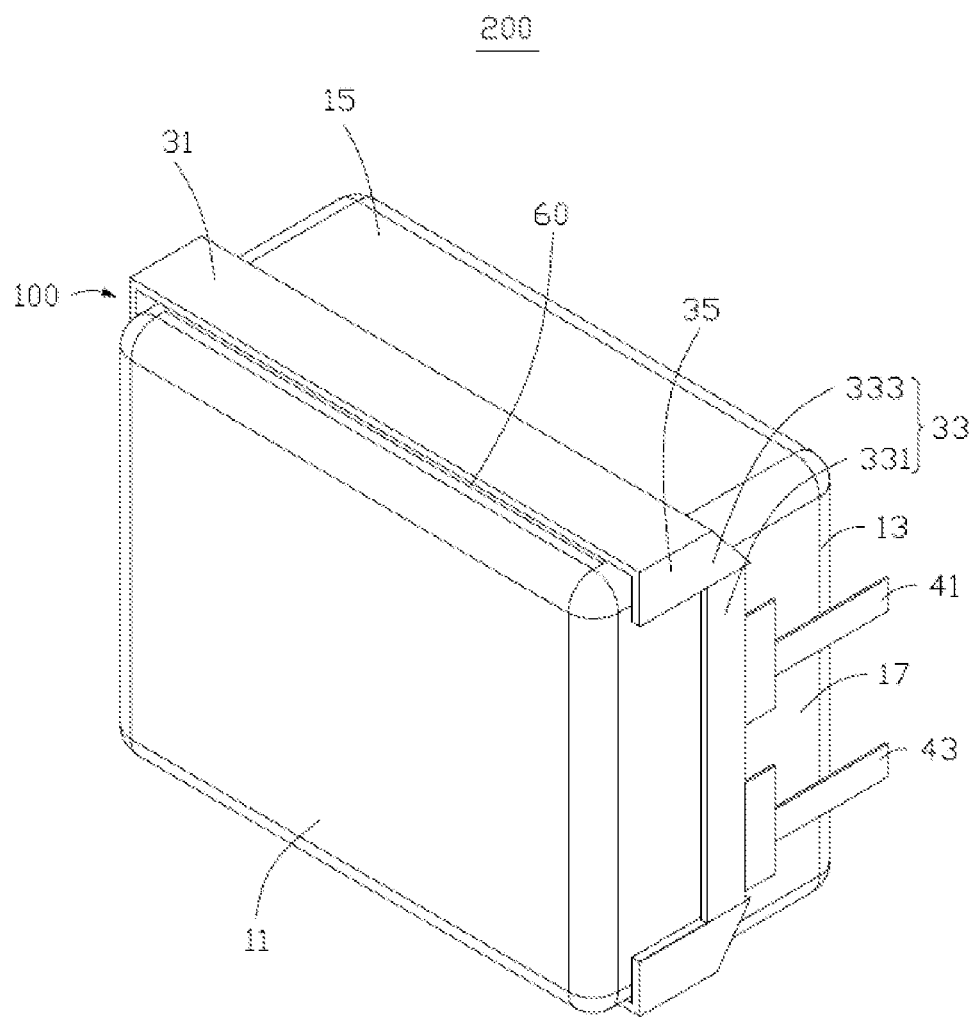
FIG. 8 is a stereoscopic schematic diagram of a battery core according to an embodiment of this application.
Figure 9:
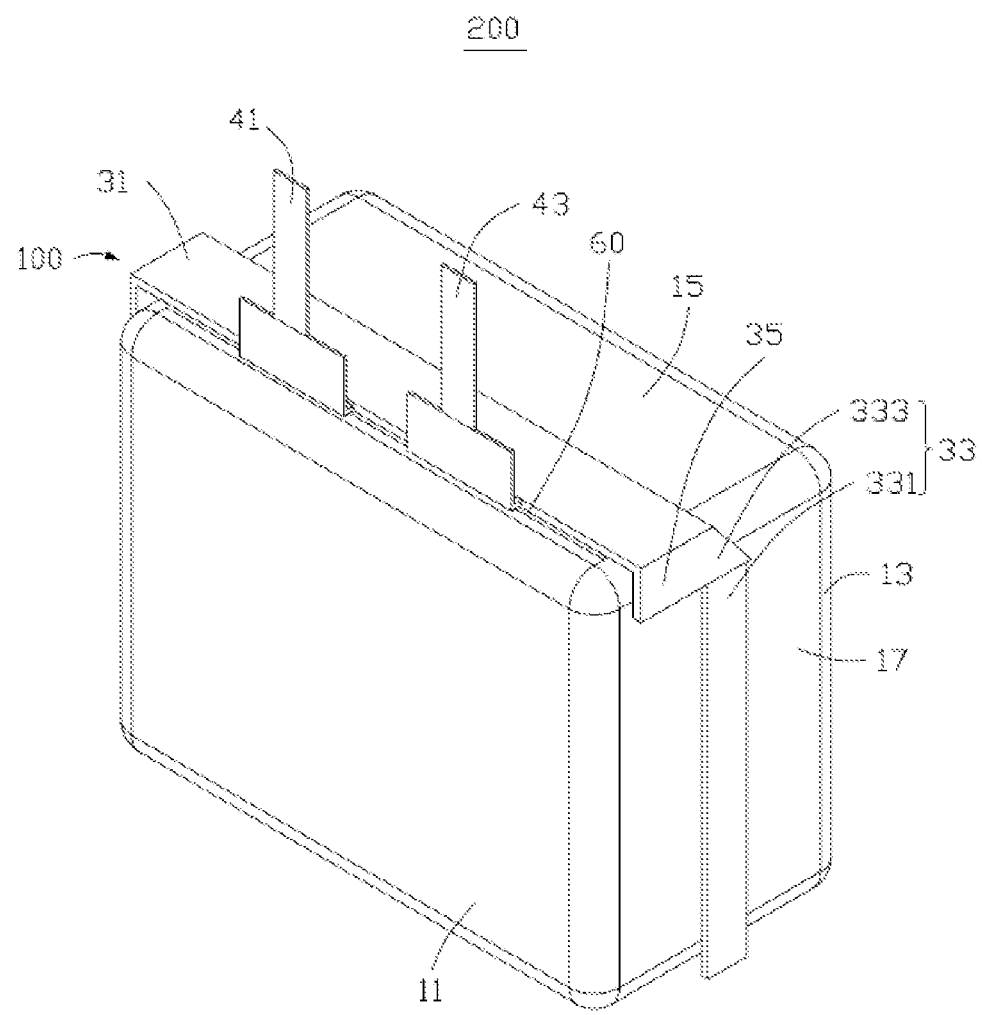
FIG. 9 is a stereoscopic schematic diagram of a battery core according to an embodiment of this application.

In some embodiments, referring to FIG. 8, the first tab 41 is clipped to the second sealing portion 33 and extends along the second sealing portion 33 so that one end of the first tab 41 protrudes from the packaging structure 100, and the other end of the first tab 41 is located in the accommodating portion 10 to connect the first electrode plate.

The second tab 43 is clipped to the second sealing portion 33 and extends along the second sealing portion 33 so that one end of the second tab 43 protrudes from the packaging structure 100, and the other end of the second tab 43 is located in the accommodating portion 10 to connect the second electrode plate.

A portion of the first tab 41 protruding from the second sealing portion 33 and a portion of the second tab 43 protruding from the second sealing portion 33 may be arranged along the direction of the second side wall 17, and extend beyond the second side wall 17 to facilitate connection with other electronic elements.

In some embodiments, the region of the first tab 41 located outside the packaging structure 100 and the region of the second tab 43 located outside the packaging structure 100 may alternatively be arranged along another direction. For example, referring to FIG. 9, the portion of the first tab 41 protruding from the first sealing portion 31 and the portion of the second tab 43 protruding from the first sealing portion 31 may be arranged perpendicular to the first side wall 15.

The packaging structure 100 in this application has a simple structure. The adhesive layer 60 bonds the accommodating portion and a face of the sealing portion that faces the accommodating portion, which is conducive to stability of the packaging structure and avoids rebounding of the bent sealing portion. In addition, when the battery core 200 uses the packaging structure 100, an adhesive layer is disposed between the accommodating portion and the sealing portion provided with the tab, which helps reducing the risk of direct contact between the tab and the packaging structure.

In addition, a person of ordinary skills in the art can make various changes and modifications based on the technical concept of this application, and all these changes and modifications should fall within the protection scope of this application.

What is claimed is:

1. A packaging structure, comprising:
a first housing and a second housing,
wherein the first housing is provided with a first concave portion, and an edge of the second housing is connected to that of the first housing to form a packaging body and a connecting portion, wherein the connecting portion is disposed at a junction of the first housing and the second housing,
the connecting portion comprises a first connecting portion along a whole side of the packaging body in a first direction and a second connecting portion along a whole side of the packaging body in a second direction, the first direction being a direction along which two tabs of the packaging structure are disposed, the second direction being a direction perpendicular to the first direction in a plane at the junction of the first housing and the second housing;
the first connecting portion along the whole side of the packaging body in the first direction is bent towards the first housing; and
the second connecting portion along the whole side of the packaging body in the second direction is bent towards the second housing.

2. The packaging structure according to claim 1, wherein the first housing comprises a first wall and a first side wall extending from an edge of the first wall, the first side wall being surrounding the first wall, and an angle between the first connecting portion and the first side wall is less than 90 degrees.

3. The packaging structure according to claim 2, wherein the included angle between the first connecting portion and the first side wall is less than 10 degrees.

4. The packaging structure according to claim 2, wherein a first adhesive layer is disposed between the first connecting portion and the first side wall.

5. The packaging structure according to claim 1, wherein the second housing is provided with a second concave portion, and the first concave portion and the second concave portion are disposed facing each other to form the packaging body.

6. The packaging structure according to claim 5, wherein the second housing comprises a second wall and a second side wall extending from an edge of the second wall, the second side wall being surrounding the second wall, and an angle between the second connecting portion and the second side wall is less than 90 degrees.

7. The packaging structure according to claim 1, wherein the second housing comprises a second wall, the connecting portion is disposed at a junction of the first housing and the second wall, and the second wall is flat.

8. The packaging structure according to claim 7, wherein the second connecting portion is disposed on the second wall.

9. The packaging structure according to claim 8, wherein a third adhesive layer is disposed between the second connecting portion and the second wall.

10. The packaging structure according to claim 1, wherein the connecting portion does not extend beyond the packaging body in a thickness direction of the packaging body, the thickness direction being a third direction perpendicular to the first direction and the second direction forming the plane at the junction of the first housing and the second housing.

11. The packaging structure according to claim 1, wherein the first housing comprises a first flange extending beyond the packaging body, the second housing comprises a second flange extending beyond the packaging body, and the first flange and the second flange are connected to form the connecting portion.

12. The packaging structure according to claim 1, wherein the connecting portion comprises a third connecting portion; the third connecting portion connects the first connecting portion and the second connecting portion.

13. The packaging structure according to claim 12, wherein the third connecting portion partially overlaps the first connecting portion or the second connecting portion.

14. The packaging structure according to claim 13, wherein a fourth adhesive layer is disposed between the third connecting portion and the first connecting portion or the second connecting portion at an overlapping portion.

15. The packaging structure according to claim 12, wherein the third connecting portion comprises a first intersecting side and a second intersecting side intersecting with each other, wherein the first intersecting side is connected to the first connecting portion, the second intersecting side is connected to the second connecting portion, and an angle between the first intersecting side and the second intersecting side is greater than or equal to 90 degrees.

16. The packaging structure according to claim 12, wherein the third connecting portion is approximately in a shape of a right-angled trapezoid.

17. A battery core, comprising an electrode assembly and a packaging structure accommodating the electrode assembly; wherein the electrode assembly comprises a first electrode plate, a second electrode plate and a separator disposed between the first electrode plate and the second electrode plate;
wherein the packaging structure comprises a first housing and a second housing, the first housing is provided with a first concave portion, and an edge of the second housing is connected to that of the first housing to form a packaging body and a connecting portion, wherein the connecting portion is disposed at a junction of the first housing and the second housing,
the connecting portion comprises a first connecting portion along a whole side of the packaging body in a first direction and a second connecting portion along a whole side of the packaging body in a second direction, the first direction being a direction along which two tabs of the packaging structure are disposed, the second direction being a direction perpendicular to the first direction in a plane at the junction of the first housing and the second housing;
the first connecting portion along the whole side of the packaging body in the first direction is bent towards the first housing; and
the second connecting portion along the whole side of the packaging body in the second direction is bent towards the second housing.

18. The battery core according to claim 17, wherein the first housing comprises a first wall and a first side wall extending from an edge of the first wall, the first side wall being surrounding the first wall, and an angle between the first connecting portion and the first side wall is less than 90 degrees.

19. The battery core according to claim 18, wherein the angle between the first connecting portion and the first side wall is less than 10 degrees.

20. The battery core according to claim 17, further comprising:
a tab connected to the first electrode plate and clipped to the first connecting portion or the second connecting portion, wherein the tab protrudes through the packaging structure along the first connecting portion or the second connecting portion.

* * * * *